US010956972B2

(12) United States Patent
Miyamoto et al.

(10) Patent No.: US 10,956,972 B2
(45) Date of Patent: Mar. 23, 2021

(54) ACCOUNT ACCESS SYSTEM

(71) Applicant: PayPal, Inc., San Jose, CA (US)

(72) Inventors: Alex Miyamoto, San Jose, CA (US); Todd Hashimoto, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 51 days.

(21) Appl. No.: 16/232,328

(22) Filed: Dec. 26, 2018

(65) Prior Publication Data

US 2020/0211098 A1 Jul. 2, 2020

(51) Int. Cl.
*G06Q 40/02* (2012.01)
*G06Q 20/08* (2012.01)
*H04L 9/32* (2006.01)

(52) U.S. Cl.
CPC ......... *G06Q 40/02* (2013.01); *G06Q 20/0855* (2013.01); *H04L 9/3213* (2013.01)

(58) Field of Classification Search
CPC ... H04L 63/10; H04L 63/0815; H04L 9/3213; G06Q 20/367; G06Q 20/401; G06Q 40/02; G06Q 20/0855
USPC .......................................... 705/35–45; 726/7
See application file for complete search history.

(56) References Cited

U.S. PATENT DOCUMENTS

| | | | | |
|---|---|---|---|---|
| 9,225,704 B1* | 12/2015 | Johansson | ............... | H04L 63/08 |
| 9,300,652 B2* | 3/2016 | Sanso | ................ | H04L 63/0807 |
| 10,003,591 B2* | 6/2018 | Hockey | ............... | H04L 63/0807 |
| 10,063,547 B2* | 8/2018 | Zhang | ................. | H04L 63/0807 |
| 10,104,059 B2* | 10/2018 | Hockey | ............... | H04L 63/0807 |
| 10,182,044 B1* | 1/2019 | Praus | ..................... | G06F 21/33 |
| 10,404,699 B2* | 9/2019 | Duggana | ............. | H04L 63/0807 |
| 10,692,138 B1* | 6/2020 | Nguyen | ................ | H04L 63/102 |
| 2001/0011274 A1* | 8/2001 | Klug | ....................... | H04L 67/22 |
| 2005/0154913 A1* | 7/2005 | Barriga | ............... | H04L 67/1002 726/4 |
| 2008/0183628 A1* | 7/2008 | Oliver | .................... | G06Q 40/12 705/71 |

(Continued)

OTHER PUBLICATIONS

Ferry, Eugene; Raw, John, O; Curran, Kevin, "Security evaluation of the OAuth2.0 framework", Computer Science Research Institute, University of Ulster, Londonderry, UK, Dec. 16, 2013, pp. 1-30. (Year: 2013).*

(Continued)

*Primary Examiner* — Mohammad Z Shaikh

(57) ABSTRACT

Operations may include providing, by an account management system of a first entity, a user interface to a third-party electronic device. The user interface may present an account access agreement that authorizes a second entity to access a third-party account managed by the account management system and owned by a third entity. The operations may further include generating, by the account management system, based on an indication that the third entity accepts the account access agreement, an account access token that is assigned to the third-party account and the second entity and that indicates that the third entity has authorized the second entity to access the third-party account. In addition, the operations may include communicating the account access token to a platform management system of the second entity such that the account access token provides the platform management system a mechanism to access the third-party account.

15 Claims, 5 Drawing Sheets

(56) References Cited

U.S. PATENT DOCUMENTS

| | | | |
|---|---|---|---|
| 2009/0271847 A1* | 10/2009 | Karjala | H04L 9/3226 726/6 |
| 2013/0019295 A1* | 1/2013 | Park | G06F 21/33 726/7 |
| 2013/0219461 A1* | 8/2013 | Esaki | H04L 63/08 726/1 |
| 2014/0380428 A1* | 12/2014 | Kobayashi | H04L 63/10 726/4 |
| 2015/0026024 A1* | 1/2015 | Calman | G06Q 40/02 705/35 |
| 2015/0121462 A1* | 4/2015 | Courage | H04L 63/102 726/4 |
| 2015/0278548 A1* | 10/2015 | Brands | H04W 12/0804 726/9 |
| 2017/0019402 A1* | 1/2017 | Kulkarni | H04L 63/0807 |
| 2017/0068954 A1* | 3/2017 | Hockey | H04L 9/3213 |
| 2017/0070500 A1* | 3/2017 | Hockey | H04L 63/0807 |
| 2018/0048640 A1 | 2/2018 | Johansson et al. | |
| 2018/0101448 A1 | 4/2018 | Ventura et al. | |
| 2019/0028514 A1* | 1/2019 | Barboi | H04L 63/0807 |
| 2019/0132317 A1* | 5/2019 | Berezin | H04L 63/105 |
| 2019/0394041 A1* | 12/2019 | Jain | H04L 63/08 |

OTHER PUBLICATIONS

International Search Report and Written Opinion, as issued in connection with International Patent Application No. PCT/US2019/068605, dated Mar. 3, 2020, 11 pgs.

\* cited by examiner

ACCOUNT ACCESS SYSTEM

FIELD

The embodiments discussed in the present disclosure are related to an account access system.

BACKGROUND

Some systems manage accounts of entities. Further other systems provide platforms for entities to interact with each other. In some instances, the accounts of the entities may be associated with interactions conducted on the platforms.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
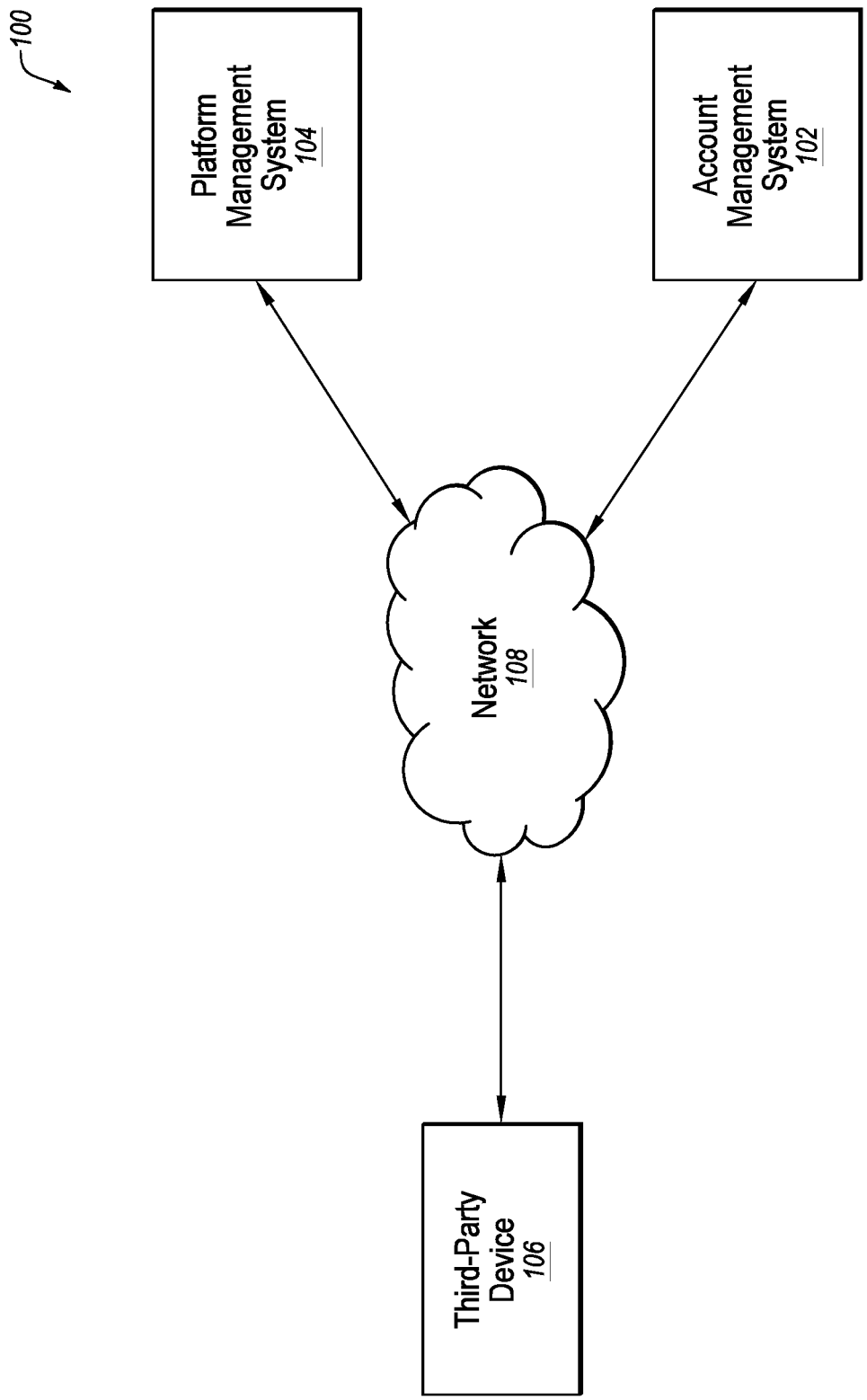
FIG. 1 illustrates an account access system configured to provide access to a third-party account.

The present disclosure may relate to providing a platform management system access to a third-party account that may be managed by an account management system. In particular, the account management system may be associated with a first entity and may be independent of the platform management system, which may be associated with a second entity that is different from the first entity. Additionally, the third-party account may be owned by a third entity that is different from the first entity and the second entity.

In some embodiments, the third entity may have an account with the platform management system and may perform operations via the platform management system. Additionally or alternatively, the third-party account may be associated with the operations conducted on the platform management system. In some instances it may be advantageous for the platform management system to have access to the third-party account of the third entity.

For example, the platform management system may be configured to host an electronic marketplace that may allow entities to exchange items (e.g., goods or services) between each other. In these or other embodiments, the account management system may be configured to manage financial accounts and the third-party account may be a financial account managed by the account management system. Additionally, funds may be transferred into or out of the third-party account as part of the exchanging of items on the electronic marketplace. In some instances, the third entity may have an agreement with a fourth entity in which the third entity may pay the fourth entity a commission in instances in which the third entity sells a particular item via the electronic marketplace. It may be advantageous for the platform management system to direct the transfer of funds from the third-party account of the third entity to an account of the fourth entity instead of the third entity having to handle the transfer. For example, removing the responsibility from the third entity may improve the user experience of the third entity with respect to using the electronic marketplace managed by the platform management system.

As another example, the platform management system may be configured to host a media management service that may manage media files (e.g., pictures, videos, etc.). In these or other embodiments, the account management service may be configured to manage social media accounts and the third-party account may be a social media account managed by the account management service. It may be advantageous for the platform management system to be able to access the third-party account to obtain media from the third-party account—for example, to consolidate the storage of media that is associated with different platforms (e.g., different social media platforms). In some embodiments, the media management service may include the sharing of media files between entities. In these or other embodiments, it may be advantageous for the platform management system to direct the sharing, with one or more other entities, of one or more media files of the third entity that may be stored in association with the social media account of the third entity.

As discussed in detail below, the present disclosure relates to systems and methods that may implement a specific mechanism that may enable the platform management system to interact with the account management system in a manner that allows the platform management system to access the third-party account. As discussed in detail below, in some embodiments the systems and methods may be such that the degree of access may be limited to protect the privacy of the third entity with respect to information that may be accessed by the platform management system, while also providing the advantages of the platform management system being able to have at least some access to the third-party account. In the present disclosure reference to "access" to accounts may refer to any level or degree of access and is not limited to meaning only "full access" to the respective accounts. As such, "access" to a particular account may range from full access to being authorized to perform or dictate performance of one or more specific operations with respect to the particular account.

As indicated above, an example of the platform management system being provided access may be with respect to the platform management system managing an electronic marketplace and the account management system managing financial accounts. Another example, of the platform management system being provided access may be with respect to the platform management system managing a media management service and the account management system managing social media. The above examples are merely illustrative of instances in which the platform management system may be provided access to the third-party account managed by the account management system. As such, the teachings of the present disclosure may be applicable to other instances and scenarios than those explicitly mentioned.

Embodiments of the present disclosure are explained with reference to the accompanying drawings.

FIG. 1 illustrates an account access system 100 ("system 100") configured to provide a platform management system access to a third-party account, in accordance with one or more embodiments of the present disclosure. The system 100 may include an account management system 102 of a first entity, a platform management system 104 of a second entity, a third-party device 106 associated with a third entity, and a network 108. Additionally, the third-party account may be an account of the third entity.

In general, the account management system 102 ("account system 102") may be operated by the first entity and may be configured to manage that may be provided to entities by the first entity. In some embodiments, the third-party account may be provided to the third entity by the first entity and the account system 102 may be configured to manage the third-party account. Examples of types of accounts that may be managed by the account system 102 may include financial accounts, social media accounts, gaming accounts, etc.

In some embodiments, the account system 102 may include any configuration of hardware and/or software, such as one or more processors, servers, or database servers that are configured to perform a task. For example, the account system 102 may include one or multiple computing systems, such as multiple servers that each include memory and at least one processor.

In general, the platform management system 104 ("platform system 104") may be operated by the second entity and may be configured to provide a network-based platform. The second entity may be a different entity from the first entity and the third entity. In some embodiments, the network based-platform may provide for online operations to be performed by entities. In these or other embodiments, the online operations may include interactions between entities. By way of example, the network-based platform may include an electronic marketplace, a social-media service, a gaming service, a discussion board, a media management service, a health practice management service, electronic property management services, Internet banking service, a bill and payment processing service, ride sharing services, task based systems, etc.

In some embodiments, the platform system 104 may include any configuration of hardware and/or software, such as one or more processors, servers, or database servers that are configured to perform a task. For example, the platform system 104 may include one or multiple computing systems, such as multiple servers that each include memory and at least one processor.

The third-party device 106 may be associated with the third entity in that the third-party device 106 may be any suitable type of electronic or digital computing device that may be used by the third entity. In these or other embodiments, the third-party device 106 may be any suitable type of electronic or digital computing device that may be used by the third entity to interact with the account system 102 and/or the platform system 104. By way of example, the third-party device 106 may include a desktop computer, a laptop computer, a smartphone, a mobile phone, a tablet computer, or any other suitable device.

In general the network 108 may be configured to communicatively couple systems and devices such as the account system 102, the platform system 104, and the third-party device 106. As such, in some embodiments, the account system 102, the platform system 104, and the third-party device 106 may interact with each other via the network 108.

In some embodiments, the network 108 may include a short-range wireless network, such as a wireless local area network (WLAN), a personal area network (PAN), or a wireless mesh network (WMN). For example, the network 108 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, among other types of LANS, PANS, and WMNS. In these or other embodiments, the network 108 may include a wide area network (WAN) that may extend over a relatively large geographical area as compared to the geographical area that may be covered by a short-range wireless network. In some embodiments, the network 108 may have numerous different configurations. In some embodiments, the network 108 may include a peer-to-peer network.

Additionally or alternatively, the network 108 may also be coupled to or may include portions of a telecommunications network for sending data in a variety of different communication protocols. In some embodiments, the network 108 may include an Internet Protocol (IP) based network such as the Internet. In some embodiments, the network 108 may include cellular communication networks for sending and receiving communications and/or data including via hypertext transfer protocol (HTTP), direct data connection, wireless application protocol (WAP), etc. The network 108 may also include a mobile data network that may include third-generation (3G), fourth-generation (4G), long-term evolution (LTE), long-term evolution advanced (LTE-A), Voice-over-LTE, Voice-over-IP, or any other mobile data network or combination of mobile data networks.

In some embodiments, the account system 102, the platform system 104, and the third-party device 106 may be configured to perform operations with respect to each other that may grant the platform system 104 access to the third-party account managed by the account system 102. For example, in some embodiments, the account system 102, the platform system 104, and the third-party device 106 may be configured to perform one or more operations described with respect to FIG. 2 related to granting the access. In some embodiments, the operations may be related to a specific set of steps that may be performed to grant the access in a secure manner. As such, as described in further detail below, security of the third-party account may be maintained to grant access while also protecting the third-party account.

Figure 3:
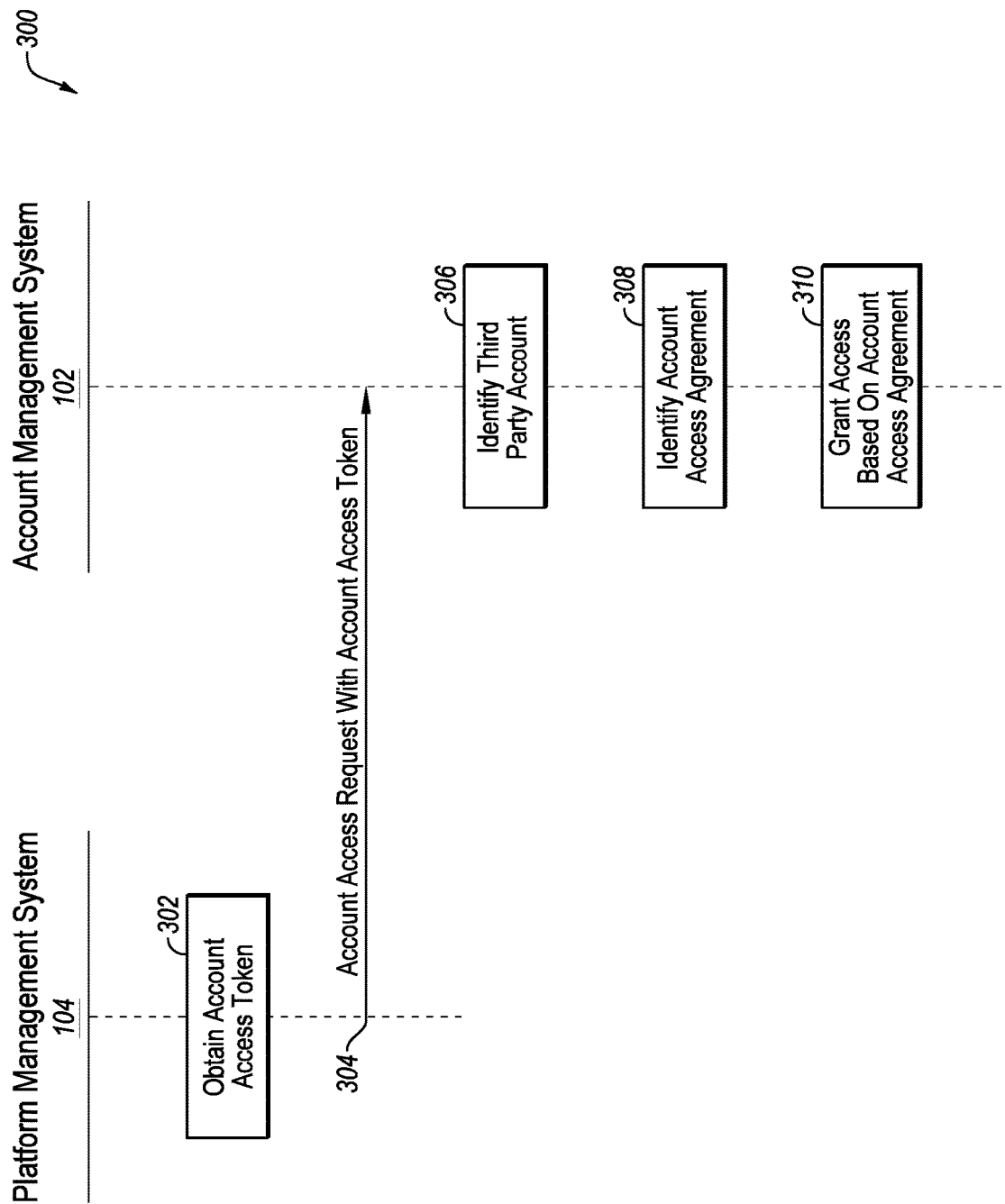
FIG. 3 illustrates example operations related to accessing a third-party account.

Further, in these or other embodiments, the account system 102 and the platform system 104 may be configured to perform one or more operations described with respect to FIG. 3 related to performing operations with respect to the third-party account as authorized by the granted access. In some embodiments, the operations may be related to a specific set of steps that may be performed such that the amount of access does not overstep a degree of access granted. As such, as described in further detail below, security of the third-party account may also be maintained to limit the amount of access granted according to permissions agreed to by the third entity.

Modifications, additions, or omissions may be made to the system 100 without departing from the scope of the present disclosure. For example, the system 100 may include more or fewer elements than those illustrated and described in the present disclosure. For example, the system 100 may include any number of third-party devices associated with any number of entities.

Figure 2:
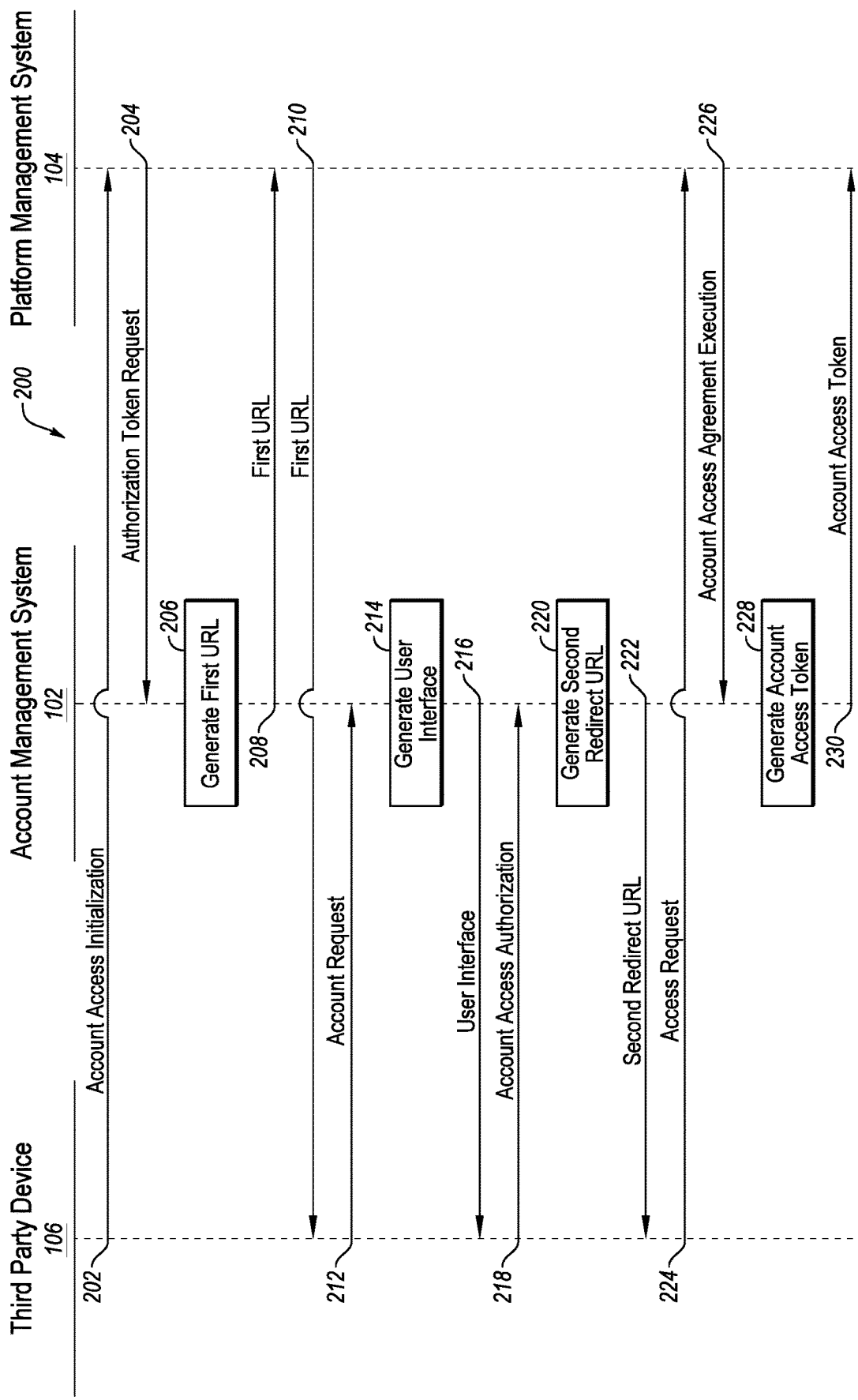
FIG. 2 illustrates example operations related to granting access to a third-party account.

FIG. 2 illustrates example operations 200 related to granting access to a third-party account. The operations 200 may be arranged in accordance with at least one embodiment described in the present disclosure. In the illustrated example, the operations 200 may be between the account system 102, the platform system 104, and the third-party device 106 of FIG. 1 with respect to granting the platform system 104 access to the third-party account of the third entity, as managed by the account system 102. In some embodiments, the operations 200 may be an example of communications and interactions between the account system 102, the platform system 104, and the third-party device 106. In these or other embodiments, the communications and interactions may be performed via the network 108 of FIG. 1. The operations 200 illustrated are not exhaustive but are merely representative of operations that may occur. Furthermore, one or more operations as illustrated may represent one or more communications, operations, and/or data exchanges. In addition, the components or elements described as performing a specific operation may vary depending on particular implementations.

At operation 202, the third-party device 106 may communicate a request to the platform system 104. In some embodiments, the request may operate as an account access initialization request to initiate account access authorization of the platform system 104 to access the third-party device.

For example, in some embodiments, the third entity may interact with a user interface of a platform website managed by the platform system 104 via the third-party device 106. In these or other embodiments, the third-party device 106 may be logged into a platform account of the third entity with respect to the platform managed by the platform system 104. Additionally or alternatively, the user interface of the platform website may include an option (e.g., as part of the platform account settings) for the third entity to authorize the platform system 104 access to an account managed by the account system 102 (e.g., the third-party account). In these or other embodiments, the request may be communicated to the platform system 104 in response to the third entity selecting the option to provide the authorization.

At operation 204, the platform system 104 may communicate an authorization token request to the account system 102. In some embodiments, the authorization token request may be for a request for a temporary authorization token that may be used as part of the process of authorizing the platform system 104 to access the third-party account. In some embodiments, the authorization token request may include an identifier of the third entity.

In some embodiments, the account system 102 may include an Application Program Interface (API) that is configured to generate the authorization token. In these or other embodiments, the authorization token request may include communicating an API request to have the API generate the authorization token.

At operation 206, in response to receiving the authorization token request, the account system 102 may generate the authorization token. In some embodiments, the authorization token may be a unique identifier that is assigned to the platform system 104 and the third entity, as indicated in the authorization token request. In these or other embodiments, the authorization token may be generated using any suitable security protocol such that it may only be used by authorized parties with respect to the access granting operations to help maintain security. Additionally or alternatively, the above-mentioned API of the account system 102 may be configured to generate the authorization token in response to the corresponding API request. For example, in some embodiments, the API may use an authorization protocol (e.g., the OAUTH 2.0 protocol, Name Value Pair protocol, SOAP protocol, etc.) to authorize API calls (e.g., the API request for the authorization token) from the platform system 104 to the account system 102. The authorization protocol may provide secure access to the API used to generate the authorization token. As such, the above-mentioned API may help provide a mechanism for the platform system 104 to obtain authorization to access the third-party account. As described in further detail below, the authorization token may be used as a reference during the access granting operations to help with correlating the authorization to the third-party account and the platform system 104.

In some embodiments, the account system 102 may be configured to generate a first redirect Uniform Resource Locator (URL) ("first URL") as part of the generation of the authorization token. In these or other embodiments, the first URL may include the authorization token embedded therein. Additionally or alternatively, the first URL may be configured to redirect an electronic device (e.g., the third-party device 106) from the platform website to an account website that may be managed by the account system 102. In these or other embodiments, the first URL may be temporary in that the first URL may expire after a certain period of time or may be used a limited number of times (e.g., once). The temporary nature of the first URL may also help maintain security by helping prevent misuse of the first URL with respect to account access authorization.

At operation 208, the account system 102 may communicate the authorization token to the platform system 104. In some embodiments, the account system 102 may communicate the authorization token to the platform system 104 by communicating the first URL with the authorization token embedded therein to the platform system 104.

At operation 210, the platform system 104 may communicate the authorization token to the third-party device 106. In some embodiments, the platform system 104 may communicate the authorization token to the third-party device 106 by communicating the first URL with the authorization token embedded therein to the third-party device 106.

At operation 212, the third-party device 106 may communicate an access request to the account system 102. The access request may be a request to access the account website. In some embodiments, the access request may be communicated in response to the third-party device 106 being redirected to the account website by the first URL. In these or other embodiments, the access request may include the authorization token, which may indicate to the account system 102 that the access request is with respect to providing account access to the platform system 104.

At operation 214, the account system 102 may generate a user interface of the account website. At operation 216, the user interface may be provided to the third-party device 106 for presentation by the third-party device.

In some embodiments, the user interface may include a user login page of the account website to allow the third entity to log into the third-party account via the third-party device 106. In these or other embodiments, the user interface may include sign up page of the account website to allow the third entity to create the third-party account in instances in which the third-party account has not been created yet. In some of these embodiments, following the creation of the third-party account, the user interface may allow the third entity to log in to the third-party account via the third-party device 106.

In these or other embodiments, following login, the user interface may be configured to include one or more selectable elements that allow the third entity to grant permission to access the third-party account by the second entity. For example, an account access agreement that grants the second entity access to the third-party account (e.g., via access granted to the platform system 104) may be presented on the user interface with a selectable element that, in response to being selected, indicates that the account access agreement has been agreed to. In some embodiments, the account system 102 may determine that the permission to be granted is with respect to the second entity and not another entity based on the authorization token included in the access request received at operation 212.

In some embodiments, the user interface may include one or more selectable permissions that may be presented with respect to the account access agreement. In these or other embodiments, the selectable permissions may indicate a degree of access to the third-party account that may be granted to the second entity.

For example, the degree of access may include full access to all aspects of the third-party account. As another example, the degree of access may include limiting the second entity (e.g., via the platform system 104) to being able to direct that the account system 102 perform a limited set of operations with respect to the third-party account without allowing the platform system 104 access to any details of the third-party account.

For instance, the third-party account may be a financial account such as a PAYPAL® account. In some embodiments, the permissions may limit the access to the third-party account to an ability to direct that the account system transfer money out of the third-party account without providing details regarding the account balance, other transactions performed with respect to the third-party account, etc. In these or other embodiments, the permissions may limit as to where the money may be transferred.

As another example, the third-party account may be a social media account. In these or other embodiments, the permissions may limit the access to the third-party account to an ability to direct that the account system send media files of the third-party account to a certain location without providing details regarding the connections, activity, etc. of the social medial account. In these or other embodiments, the permissions may limit as to where the media files may be transferred.

At operation 218, the third entity may indicate acceptance of the account access agreement via a selection on the user interface of the account website using the third-party device 106. In these or other embodiments, the acceptance may include a permissions selection indicating the degree of access that is authorized. In these or other embodiments, the indicated acceptance may be an account access authorization that is communicated to the account system 102.

At operation 220, the account system 102 may be configured to generate a second redirect URL ("second URL") in response to receiving the account access authorization. In these or other embodiments, the second URL may include the authorization token embedded therein. Additionally or alternatively, the second URL may be configured to redirect an electronic device (e.g., the third-party device 106) from the account website to the platform website. In these or other embodiments, the second URL may be temporary in that the second URL may expire after a certain period of time or may be used a limited number of times (e.g., once). The temporary nature of the second URL may also help maintain security by helping prevent misuse of the second URL with respect to account access authorization.

At operation 222, the account system 102 may communicate the second URL to the third-party device 106. At operation 224, the third-party device 106 may communicate an access request to the platform system 104. The access request may be a request to access the platform website. In some embodiments, the access request may be communicated in response to the third-party device 106 being redirected to the platform website by the first URL. In these or other embodiments, the access request may include the authorization token, which may be used as an indication that the access request is with respect to providing account access to the platform system 104.

At operation 226, the platform system 104 may communicate an account access agreement execution command to the account system 102. In some embodiments, the command may be a request to generate an account access token. The account access token may be a unique token that is assigned to the third-party account and the second entity to indicate that the second entity has authority to access the third-party account. For example, in some embodiments, the account access token may represent the third-party account and may be assigned to and the second entity. In some embodiments, the command may include the authorization token to indicate that the account access token being requested corresponds to the third-party account and the second entity. In these or other embodiments, the account access token request may include communicating an API request to have the API of the account system 102 generate the authorization token.

At operation 228, the account system 102 may generate the account access token in response to receiving the command at operation 226. In some embodiments, the account access token may be generated using any suitable security protocol to help ensure that the account access token may only be used by the second entity (e.g., via the platform system 104). For example, using any suitable security protocol, an account number of the third-party account may be tokenized to generate the account access token. The tokenization may be such that the third-party account number may not be accessible without the proper tools to unlock the token. In these or other embodiments, the account access token may be assigned only to the second entity such that the account access token may only be used by the second entity.

In these or other embodiments, the generation of the account access token may include correlating the account access token with the account access agreement agreed to by the third entity. For example, in some embodiments, the account access agreement or a reference to the account access agreement may be stored with or included within the account access token in a manner that associates the account access agreement and the account access token together. Additionally or alternatively, the account access token or a reference to the account access token may be stored with or included with the account access agreement in a manner that associates the account access agreement and the account access token together. As described in further detail below, the association of the account access token with the third-party account, the second entity, and the account access agreement may allow for the account access token to be used by the second entity (e.g., via the platform system 104) to access the third-party account according to the permissions granted. Further, the tokenization may be such that if any entity or associated system other than the second entity (e.g., via the platform system 104) attempts to use to account access token to access the third-party account, such attempts would be denied.

For example, in some embodiments, the generating of the account access token may include correlating permissions and conditions with the account access token. The permissions and conditions may relate to limiting the use of the account access token to the platform system 104. For instance, the platform system 104 may have credentials that may be used to direct operations with respect to the account system 102. In these or other embodiments, the conditions and permissions associated with the account access token may include only allowing use in conjunction with receiving the credentials of the platform system 104. As such, attempts to use the account access token by other systems that do not have the credentials may be denied by the account system 102.

Additionally or alternatively, the above-mentioned API of the account system 102 may be configured to generate the account access token in response to the corresponding API request. As such, the above-mentioned API may help provide a further mechanism for the platform system 104 to obtain authorization to access the third-party account.

At operation 230, the account access token may be communicated to the platform system 104. The platform system 104 may store the account access token for future use. For example, as indicated above and described in further detail below, the platform system 104 may use the account access token to access the third-party account. The access may be dictated according to the terms of the access account agreement and the permissions granted during acceptance of the access account agreement, which may help maintain the security of the third-party account.

Further, the security measures incorporated with the generation and distribution of the account access token may also help maintain the security of third-party account. For instance, in some embodiments, the platform system 104 may include API permissions granted to the platform system 104 by the account system 102 that indicate that the platform system 104 is authorized to use the account access token. In these or other embodiments, the platform system 104 may be required to communicate the permissions and/or credentials granted from the account system 102, which may be used to verify that an API call with the account access token included therein derived from the platform system 104.

The operations 200 may thus include a specific set of operations that may provide a mechanism for the platform system 104 to access the third-party account while also maintaining security of the third-party account. Further, the operations 200 may provide a mechanism that allows the platform system 104 to coordinate and initialize the acceptance of the account access agreement, which may decrease the amount of steps that may be initiated and performed by the third entity, thus making it easier for the third entity to grant account access.

Modifications, additions, or omissions may be made to the operations 200 without departing from the scope of the present disclosure. For example, in some embodiments, the operations 200 may be arranged in a different order or performed at the same time. In addition, one or more operations may be performed by different components or elements than as described.

In these or other embodiments, the operations 200 may include fewer operations than those described and/or other operations. For instance, in some embodiments, rather than having the platform system 104 coordinate the granting of the account access, the third-party device 106 and the account system 102 may perform the operations 212, 214, 216, and 218 without any involvement of the platform system 104. In these or other embodiments, in response to the account access agreement being agreed at operation 218, the account system 102 may perform the operations 228 and 230 without the operations 220, 222, 224, and 226 having been performed.

Additionally or alternatively, rather than the account access token being communicated to the platform system 104 for storage therein, in some embodiments, the account access token may be stored by the account system 102. In these or other embodiments, as discussed in further detail below, the platform system 104 may request the account access token from the account system 102 in instances in which the platform system 104 may request access to the third-party account.

FIG. 3 illustrates example operations 300 related to accessing a third-party account. The operations 300 may be arranged in accordance with at least one embodiment described in the present disclosure. In the illustrated example, the operations 300 may be between the account system 102 and the platform system 104 of FIG. 1 with respect to the platform system 104 accessing to the third-party account of the third entity, as managed by the account system 102. In some embodiments, the operations 300 may be an example of communications and interactions between the account system 102 and the platform system 104. In these or other embodiments, the communications and interactions may be performed via the network 108 of FIG. 1. The operations 300 illustrated are not exhaustive but are merely representative of operations that may occur. Furthermore, one or more operations as illustrated may represent one or more communications, operations, and/or data exchanges. In addition, the components or elements described as performing a specific operation may vary depending on particular implementations.

At operation 302, the platform system 104 may obtain an account access token that is associated with the third-party account. For example, the platform system 104 may obtain the account access token described above with respect to FIG. 2. In some embodiments, the platform system 104 may obtain the account access token according to one or more operations of FIG. 2 described above. In these or other embodiments, the platform system 104 may have the account access token stored therein and may be configured to obtain the account access token as stored.

Additionally or alternatively, the account system 102 may have the account access token stored thereon and the platform system 104 may communicate a request to the account system 102 for the account access token. In response to the request, the account system 102 may communicate the account access token to the platform system 104.

In some embodiments, the request may be made using any suitable security protocol to verify that the account access token is being requested by the platform system 104, as authorized, instead of to an unauthorized system. For example, the platform system 104 may be configured to communicate an API call that requests the account access token. In some embodiments, the platform system 104 may include in the API call, API permissions granted to the platform system 104 by the account system 102 that indicate that the platform system 104 is authorized to use the account access token. In these or other embodiments, the platform system 104 may communicate credentials granted from the account system 102, which may be used to verify that the API call requesting the account access token derived from the platform system 104 and not an unauthorized system. In response to the credentials and/or permissions being verified with respect to the account access token, the account system 102 may communicate the account access token to the platform system 104.

At operation 304, the platform system 104 may communicate the account access token to the account system 102. In some embodiments, the platform system 104 may communicate the account access token with a request to access the third-party account. In these or other embodiments, the request to access the account may include an indication as to what degree of access the platform system 104 is requesting.

For example, the degree of access may include directing certain operations to occur with respect to the third-party account. For instance, in instances in which the third-party account is a financial account, the request may include direction to transfer funds out of the third-party account to another account.

In some embodiments, the platform system 104 may obtain and communicate the account access token in response to a triggering event occurring. For example, the platform system 104 may correspond to an electronic marketplace and a purchase of an item being sold by the third entity may be made on the electronic marketplace. Additionally, the platform system 104 may have access to a reference agreement between the third entity and a fourth entity in which, according to the reference agreement, the third entity is to pay the fourth entity a commission with respect to the sale of the item. In these or other embodiments, the platform system 104 may be authorized to initiate the transfer of funds from the third-party account to an account of the fourth entity to pay the commission. In some of these embodiments, the platform system 104 may use the account access token to direct the transfer of funds. As such, the platform system 104 may obtain the account access token in response to the item being sold by the third entity in some embodiments.

In some embodiments, the request to access the third-party account may be made using any suitable security protocol to verify that the access is being requested by the platform system 104, as authorized, instead of to an unauthorized system. For example, the platform system 104 may be configured to communicate an API call that requests the account access and that includes the account access token. In some embodiments, the platform system 104 may include in the API call, the API permissions that indicate that the platform system 104 is authorized to use the account access token. In these or other embodiments, the platform system 104 may communicate its credentials, which may be used to verify that the API call requesting the account access derived from the platform system 104 and not an unauthorized system.

At operation 306, the account system 102 may identify the third-party account based on the account access token included in the account access request. For example, as indicated above, the account access token may represent the third-party account and the account system 102 may identify the third-party account accordingly. Further, as also indicated above, the account access token may represent the third-party account in a manner that may protect the third-party account identification from being available to unauthorized entities. In these or other embodiments, using any suitable token related protocols, the account system 102 may verify that the account access token is associated with the platform system 104 and that the platform system 104 is authorized to communicate the account access token. For example, the account system 102 may use the credentials and/or permissions included in the request to access the third-party account to verify that the platform system 104 is authorized to use the account access token included with the request.

At operation 308, the account system 102 may be configured to identify the account access agreement that is associated with the account access token. As indicated above, the account access agreement may indicate the parties involved in the account access agreement and the degree of access granted by the account access agreement. For example, the account access agreement may indicate that the second entity has been granted access to the third-party account (e.g., via the platform system 104). Additionally, the account access agreement may include the permissions that the third party granted with respect to the degree of access.

At operation 310, the account system 102 may grant access to the third-party account. In these or other embodiments, the account system 102 may grant the access in response to verifying that the account access request was an authorized request that in fact derived from the platform system 104. In these or other embodiments, the account system 102 may grant the access in response to determining that the access requested in the account access request is consistent with the level of access granted by the permissions of the account access agreement.

In some embodiments, the account system 102 may perform one or more operations with respect to the third-party account as part of granting the access. For example, in instances in which the account access request includes a transfer of funds, the account system 102 may grant the access by transferring the funds. In some embodiments, the transfer of funds may occur without the platform system 104 having access to other details with respect to the third-party account. For example, the transfer may occur without the platform system 104 having access to an account type of the third-party account, a total amount of funds included in the third-party account, other transactions that involve the third-party account etc. As such, the level of access may be enough to allow the platform system 104 to perform or direct performance of operations with respect to the third-party account while also limiting access to details about the third-party account that the platform system 104 does not need to have access to in order to accomplish the particular operations.

The operations 300 may thus include a specific set of operations that may provide a mechanism for the platform system 104 to access the third-party account while also maintaining security of the third-party account. Modifications, additions, or omissions may be made to the operations 300 without departing from the scope of the present disclosure. For example, in some embodiments, the operations 300 may be arranged in a different order or performed at the same time. In addition, one or more operations may be performed by different components or elements than as described.

In these or other embodiments, the operations 300 may include, more or fewer operations than those described, and/or other operations.

Figure 4:
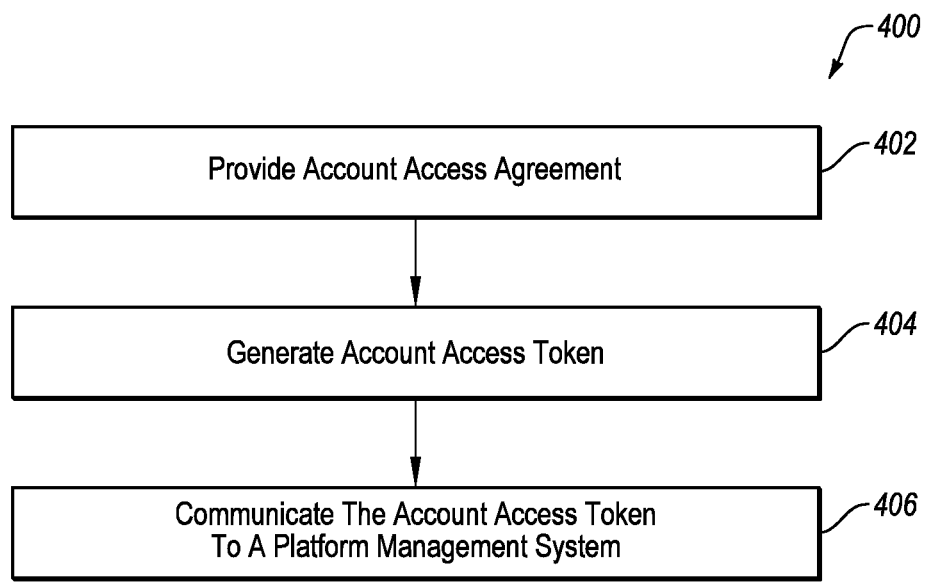
FIG. 4 is a flowchart of an example method to grant access to a third-party account.

FIG. 4 is a flowchart of an example method 400 to grant access to a third-party account. The method 400 may be arranged in accordance with at least one embodiment described in the present disclosure. One or more of the operations of the method 400 may be performed, in some embodiments, by a device or system, such as one or more elements of the system 100 of FIG. 1. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation. In general, the third-party account may be owned by a third-party entity and managed by an account management system (e.g., the account management system 102 of FIGS. 1-3) that is operated by a first entity. The account access may be granted to a second entity that is different from the first entity and the third-party entity and a platform management system of the second entity (e.g., the platform management system 104 of FIGS. 1-3).

The method 400 may include block 402 at which an account access agreement may be provided for presentation to a third-party entity. For example, a user interface of an account website managed by an account management system (e.g., the account management system 102 of FIG. 1) may be generated. In these or other embodiments, the user interface may include the account access agreement and the user interface may be provided to a third-party device that is associated with the third-party entity, such as described above with respect to operations 214 and 216 of FIG. 2.

At block 404, an account access token may be generated. In some embodiments, the account access token may be generated in response to an indication that the third-party entity accepts the account access agreement. The account access token may be assigned to the third-party account and the second entity and may indicate that the third entity has authorized the second entity (e.g., via the platform management system of the second entity) to access the third-party account. The account access token may be analogous to that described above with respect to FIGS. 2 and 3. In these or other embodiments, the account access token may be generated such as described above with respect to operation 228 of FIG. 2.

At block 406, the account access token may be communicated to the platform management system of the second entity. As detailed above, the platform management system may use the account access token to access the third-party account.

Modifications, additions, or omissions may be made to the method 400 without departing from the scope of the present disclosure. For example, some of the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, in some embodiments, the method 400 may include one or more of the operations described above with respect to FIGS. 2 and 3.

Figure 5:
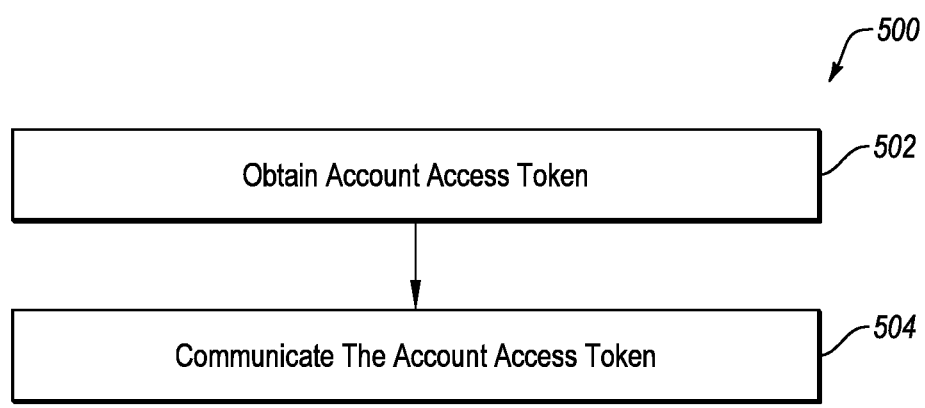
FIG. 5 is a flowchart of an example method to access to a third-party account.

FIG. 5 is a flowchart of an example method 500 to access to a third-party account. The method 500 may be arranged in accordance with at least one embodiment described in the present disclosure. One or more of the operations of the method 500 may be performed, in some embodiments, by a device or system, such as one or more elements of the system 100 of FIG. 1. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation. In general, the third-party account may be owned by a third-party entity and managed by an account management system (e.g., the account management system 102 of FIGS. 1-3) that is operated by a first entity. The third-party account may be accessed by a platform management system of a second entity (e.g., the platform management system 104 of FIGS. 1-3).

The method 500 may include block 502 at which an account access token may be obtained by the platform management system. For example, one or more of the operations of FIG. 2 may be performed such that the platform management system obtains the account access token from the account management system. In these or other embodiments, the account access token may be received from the account management system and stored on the platform management system. Additionally or alternatively, the account access token may be obtained by reading a copy of such from the storage. In some embodiments, the account access token may be obtained in response to a triggering event such as described above with respect to operation 302 of FIG. 3.

At block 504, the account access token may be communicated to the account management system. For example, in some embodiments, the account access token may be communicated such as described above with respect to operation 304 of FIG. 3.

The account access token and communication thereof may operate as a mechanism that allows the platform management system to access the third-party account. For example, the account access token and the communication thereof may be such that the account management system performs one or more operations with respect to the third-party account, such as described above with respect to operations 306, 308, and 310 of FIG. 3.

Modifications, additions, or omissions may be made to the method 500 without departing from the scope of the present disclosure. For example, the outlined operations and actions are only provided as examples, and some of the operations and actions may be optional, combined into fewer operations and actions, or expanded into additional operations and actions without detracting from the essence of the disclosed embodiments. For example, in some embodiments, the method 500 may include one or more of the operations described above with respect to FIGS. 2 and 3.

Figure 6:
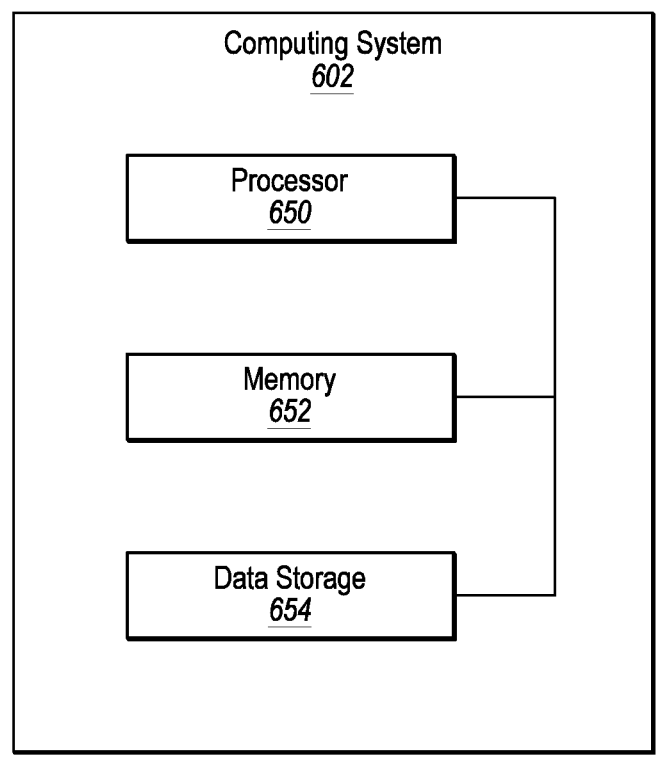
FIG. 6 illustrates an example computing system.

FIG. 6 illustrates a block diagram of an example computing system 602. The computing system 602 may be configured according to at least one embodiment of the present disclosure and may be an example of computing systems that may include or be part of one or more elements of the system 100 of FIG. 1. For example, the account management system 102, the platform management system 104, and/or the third-party device 106 may include one or more computing systems 602. The computing system 602 may include a processor 650, a memory 652, and a data storage 654. The processor 650, the memory 652, and the data storage 654 may be communicatively coupled.

In general, the processor 650 may include any suitable special-purpose or general-purpose computer, computing entity, or processing device including various computer hardware or software modules and may be configured to execute instructions stored on any applicable computer-readable storage media. For example, the processor 650 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 650 may include any number of processors configured to, individually or collectively, perform or direct performance of any number of operations described in the present disclosure. Additionally, one or more of the processors may be present on one or more different electronic devices, such as different servers.

In some embodiments, the processor 650 may be configured to interpret and/or execute program instructions and/or process data stored in the memory 652, the data storage 654, or the memory 652 and the data storage 654. In some embodiments, the processor 650 may fetch program instructions from the data storage 654 and load the program instructions in the memory 652. After the program instructions are loaded into memory 652, the processor 650 may execute the program instructions.

The memory 652 and the data storage 654 may include computer-readable storage media for carrying or having computer-executable instructions or data structures stored thereon. Such computer-readable storage media may include any available media that may be accessed by a general-purpose or special-purpose computer, such as the processor 650. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

Modifications, additions, or omissions may be made to the computing system 602 without departing from the scope of the present disclosure. For example, in some embodiments, the computing system 602 may include any number of other components that may not be explicitly illustrated or described.

For instance, in some embodiments, the computing system 602 may include a communication unit that includes any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the system 602 to communicate with other systems, such as computing devices and/or other networks.

Additionally or alternatively, the computing system 602 may include one or more user interfaces in some embodiments. The user interfaces may include any system or device to allow a user to interface with the system 602. For example, the interfaces may include a mouse, a track pad, a keyboard, and/or a touchscreen, among other devices or systems. The interfaces may also include a graphical user interface that may be presented on a display that may be included with the computing system 602. The display may be configured as one or more displays, like an LCD, LED, or other type of display. The display may be configured to present content such as video, text, user interfaces, and other data as directed by the processor.

As indicated above, the embodiments described in the present disclosure may include the use of a special purpose or general purpose computer (e.g., the processor 650 of FIG. 6) including various computer hardware or software modules, as discussed in greater detail below. Further, as indicated above, embodiments described in the present disclosure may be implemented using computer-readable media (e.g., the memory 652 or data storage 654 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   receiving, by an account management system of a first entity, an authorization token request from a platform management system of a second entity, wherein the authorization token is useable during a process of authorizing the platform management system to access a third-party account managed by the account management system and owned by a third entity;
   sending, from the account management system to the platform management system, a first temporary redirect Uniform Resource Locator(URL), wherein the first temporary redirect URL includes the authorization token, wherein the first temporary redirect URL expires after a first specified period of time or first number of usages;
   receiving, from a third-party electronic device using the first temporary redirect URL and the authorization token, an account access request to authorize the second entity to access the third-party account;
   receiving, from the third-party electronic device, an indication that the third entity accepts an account access agreement corresponding to the account access request;
   sending, from the account management system to the third-party device, a second temporary redirect Uniform Resource Locator (URL) operable to direct the third-party device to the platform management system, wherein the second temporary redirect URL includes the authorization token, wherein the second temporary redirect URL expires after a second specified period of time or second number of usages;
   receiving, from the platform management system, an account access token request, wherein the account access token request includes the authorization token;
   in response to verifying the authorization token included in the account access token request, generating, by the account management system an account access token that is assigned to the third-party account and the second entity and that indicates that the third entity has authorized the second entity to access the third-party account;
   communicating the account access token to the platform management system of the second entity;
   receiving the account access token from the platform management system; and
   in response to receiving the account access token, granting the platform management system access to the third-party account based on the platform management system being associated with the second entity and based on the account access token being assigned to the third-party account and the second entity.

2. The method of claim 1, further comprising:
   accessing, in response to receiving the account access token, the account access agreement based on the platform management system being associated with the second entity and based on the account access token being assigned to the third-party account and the second entity; and
   determining, based on the account access agreement, permissions provided to the second entity by the third entity with respect to access to the third-party account;
   wherein the access granted to the platform management system is based on the determined permissions.

3. The method of claim 1, wherein the access of the platform management system is limited to being able to direct the account management system to perform a limited subset of operations with respect to the third-party account without allowing the platform management system access to details of the third-party account.

4. The method of claim 1, wherein receiving the account access request includes receiving the account access request via a user interface that includes one or more permissions with respect to the account access agreement in which the one or more permissions are selectable by the third entity via the user interface and dictate a degree of access of the third-party account by the second entity as selected by the third entity.

5. The method of claim 1, wherein the account access token includes the authorization token.

6. The method of claim 1, wherein the first and second temporary redirect URLs both may only be used one.

7. A system comprising:
   one or more processors; and
   one or more non-transitory computer-readable media containing instructions which, in response to being executed by the one or more processors, cause the system to perform operations comprising:
   receiving, at a platform management system of a second entity from an account management system of a first entity, a first temporary redirect Uniform Resource Locator (URL), wherein the first temporary redirect URL includes an authorization token useable during a process of authorizing the platform management system to access a third-party account managed by the account management system and owned by a third entity; wherein the first temporary redirect URL expires after a first specified period of time or first number of usages;

sending, from the platform management system to a third-party electronic device, the first temporary redirect URL;

receiving, from the third-party electronic device via a second temporary redirect Uniform Resource Locator (URL) generated by the account management system, an access request, wherein the access request includes the authorization token, wherein the second temporary redirect URL expires after a second specified period of time or second number of usages;

communicating, to the account management system of the first entity from the platform management system of the second entity, an account access execution command in response to the access request, wherein the account access execution command includes the authorization token;

receiving, from the account management system as a response to the account access execution command, an account access token that is assigned to the third-party account and the second entity and that indicates that the third entity has authorized the second entity to access the third-party account; and communicating, by the platform management system, an account access request that requests that a particular operation be performed with respect to the third-party account, the account access request including the account access token.

8. The system of claim 7, wherein the operations further comprise:

receiving a request to initiate account access authorization from the third-party electronic device associated with the third entity;

wherein first temporary URL is operable to direct the third-party electronic device to a website of the account management system to coordinate execution of an account access agreement authorizing the second entity to access the third-party account managed by the account management system and owned by the third entity.

9. The system of claim 7, wherein the account access token includes the authorization token.

10. One or more non-transitory computer-readable media containing instructions which, in response to being executed by one or more processors, cause a system to perform operations comprising:

receiving, by an account management system of a first entity, an authorization token request from a platform management system of a second entity, wherein the authorization token is useable during a process of authorizing the platform management system to access a third-party account managed by the account management system and owned by a third entity;

sending, from the account management system to the platform management system, a first temporary redirect Uniform Resource Locator(URL), wherein the first temporary redirect URL includes the authorization token, wherein the first temporary redirect URL expires after a first specified period of time or first number of usages;

receiving, from a third-party electronic device using the first temporary redirect URL and the authorization token, an account access request to authorize the second entity to access the third-party account;

receiving, from the third-party electronic device, an indication that the third entity accepts an account access agreement corresponding to the account access request;

sending, from the account management system to the third-party device, a second temporary redirect Uniform Resource Locator(URL) operable to direct the third-party device to the platform management system, wherein the second temporary redirect URL includes the authorization token, wherein the second temporary redirect URL expires after a second specified period of time or second number of usages;

receiving, from the platform management system, an account access token request, wherein the account access token request includes the authorization token;

in response to verifying the authorization token included in the account access token request, generating, by the account management system an account access token that is assigned to the third-party account and the second entity and that indicates that the third entity has authorized the second entity to access the third-party account; and communicating the account access token to the platform management system of the second entity such that the account access token is usable by the platform management system to access the third-party account according to the account access agreement.

11. The one or more non-transitory computer-readable media of claim 10, wherein the operations further comprise:

receiving the account access token from the platform management system; and in response to receiving the account access token, granting the platform management system access to the third-party account based on the platform management system being associated with the second entity and based on the account access token being assigned to the third-party account and the second entity.

12. The one or more non-transitory computer readable media of claim 11, wherein the operations further comprise:

accessing, in response to receiving the account access token, the account access agreement based on the platform management system being associated with the second entity and based on the account access token being assigned to the third-party account and the second entity; and determining, based on the account access agreement, permissions provided to the second entity by the third entity with respect to access to the third-party account;

wherein the access granted to the platform management system is based on the determined permissions.

13. The one or more non-transitory computer-readable media of claim 11, wherein the access of the platform management system is limited to being able to direct the account management system to perform a limited subset of operations with respect to the third-party account without allowing the platform management system access to details of the third-party account.

14. The one or more non-transitory computer-readable media of claim 10, wherein receiving the account access request includes receiving the account access request via a user interface that includes one or more permissions with respect to the account access agreement in which the one or more permissions are selectable by the third entity via the user interface and dictate a degree of access of the third-party account by the second entity as selected by the third entity.

15. The one or more non-transitory computer readable media of claim 10, wherein the account access token includes the authorization token.

* * * * *